Figure 5:
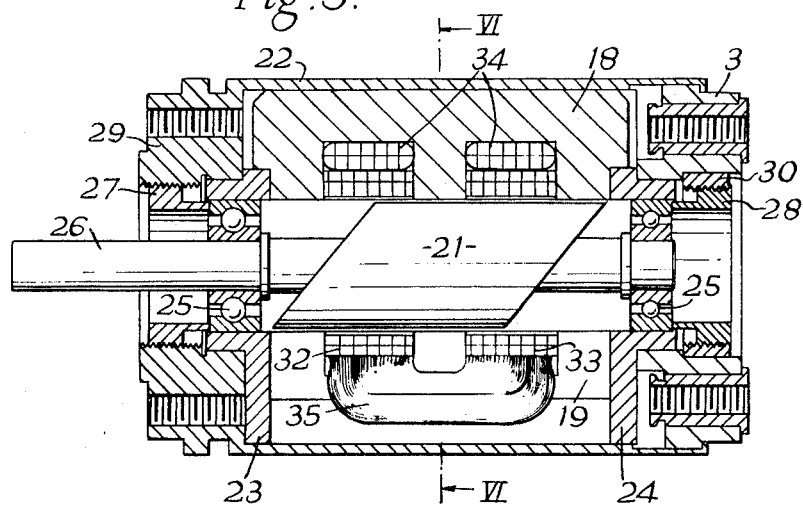

May 5, 1964 W. J. CRASKE 3,132,269
DYNAMO ELECTRIC MACHINES
Filed June 24, 1960 2 Sheets-Sheet 1
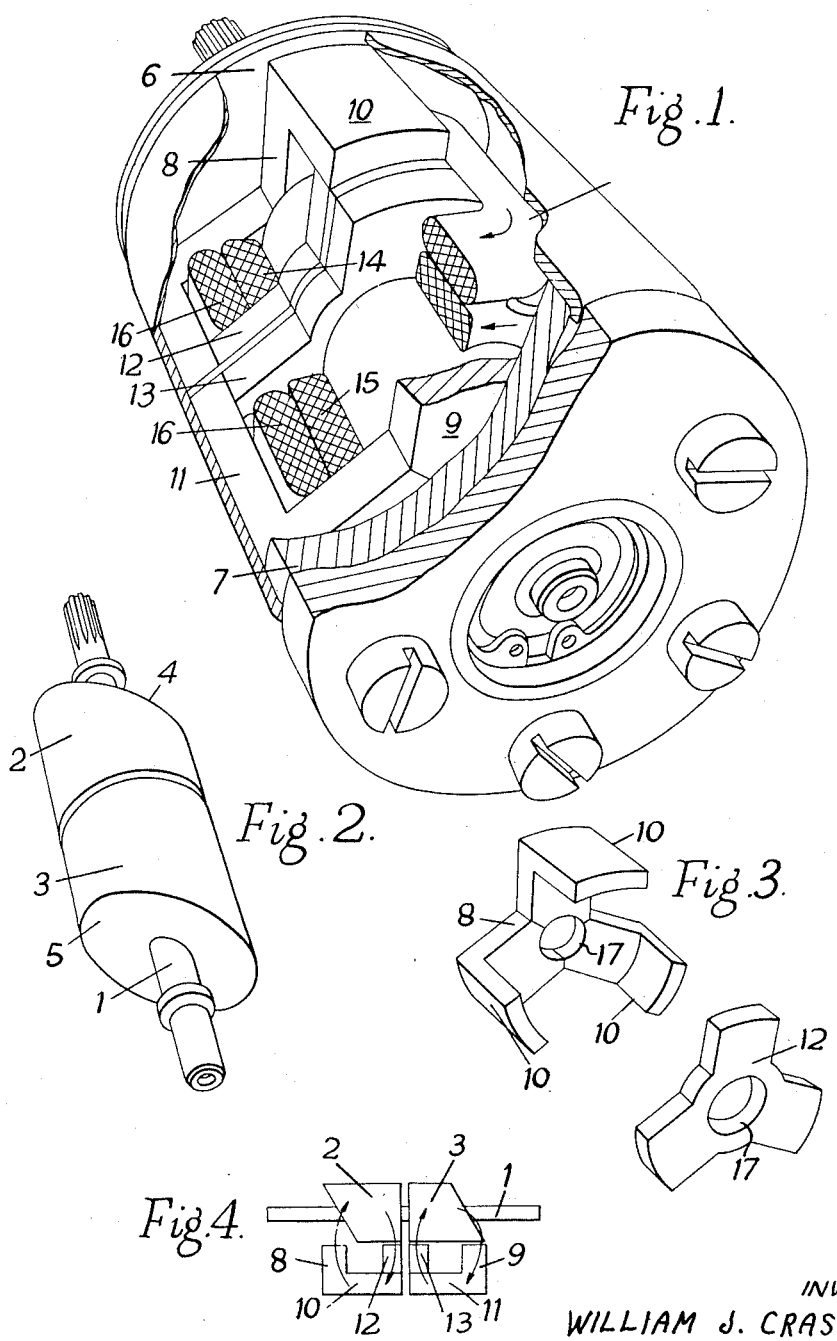
INVENTOR
WILLIAM J. CRASKE
BY
Wenderoth, Lind & Ponack
ATTORNEYS May 5, 1964 W. J. CRASKE 3,132,269
DYNAMO ELECTRIC MACHINES
Filed June 24, 1960 2 Sheets-Sheet 2

INVENTOR
WILLIAM J. CRASKE
BY
Wenderoth, Lind & Ponack
ATTORNEYS

United States Patent Office 3,132,269
Patented May 5, 1964

3,132,269
DYNAMO ELECTRIC MACHINES
William John Craske, Ilford, England, assignor to Elliott Brothers (London) Limited, London, England
Filed June 24, 1960, Ser. No. 38,474
Claims priority, application Great Britain July 1, 1959
7 Claims. (Cl. 310—111)

This invention relates to improvements in dynamo electric machines and more particularly to dynamo electric machines of the kind which are used for translating a mechanical position or motion into some form of electrical information or vice versa.

It is an object of the present invention to provide an improved construction of dynamo electric machine and particularly a construction which avoids the use of slip rings and brushes and also avoids the necessity for providing slots in the rotor and/or stator in which windings are positioned.

According to the present invention, the improved dynamo electric machine comprises a rotor and a stator both of ferro-magnetic material wherein the stator includes at least one element comprising two pole pieces which are connected by a yoke and which are presented to the rotor at axially spaced points thereon, and the rotor is so shaped that the reluctance of the magnetic circuit including the rotor and the stator element varies as the rotor is turned. Conveniently the rotor is of cylindrical shape and has at least one of its end faces inclined to the axis of rotation. The pole pieces of the stator element may be so arranged in relation to the rotor that the air gap between one of them and the rotor is constant whereas the air gap between the other and the rotor varies, for example, in area and/or in magnitude, as the rotor is turned. Preferably the machine includes a plurality of stator elements which are angularly distributed around the rotor. In such case the total reluctance of the whole magnetic circuit will remain substantially constant since the circuit is made up of a number of paths of high reluctance in parallel with a path of relatively low reluctance, the position of the rotor determining the location of the path of relatively low reluctance. The machine may include one winding, for example a primary winding, which is arranged around the rotor and another winding, a secondary winding, which is arranged around the stator element or a plurality of secondary windings one for each stator element.

In a preferred form, the machine comprises two similar magnetic systems so arranged that as the reluctance of a magnetic circuit including a stator element of one system increases, the reluctance of a magnetic circuit including an associated stator element of the other system decreases.

In one form such a machine comprises two rotors each having one or more stator elements, the two rotors and associated stator elements being arranged end to end while the outer end faces of the two rotor portions are shaped as described. In such a construction the one winding may comprise two coils each arranged around the individual rotor portions while the other windings may comprise coils each arranged around adjacent pole pieces of a stator element of each system.

In another form such a machine may comprise a single rotor having both end faces suitably shaped and each stator element may comprise three pole pieces arranged adjacent the end portions and the central portion of the rotor.

Figure 6:
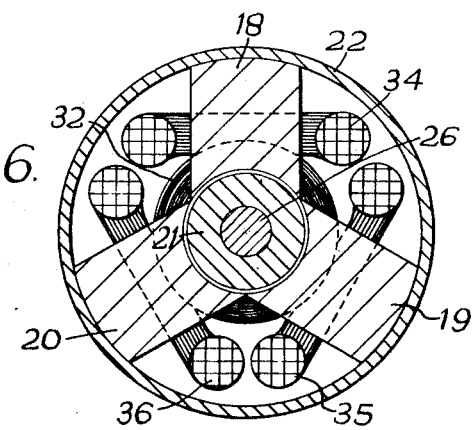

In order that the invention may be clearly understood some forms of the machine will now be described with reference to the accompanying drawings, in which:

FIGURE 1 is a perspective view of one form of the machine, parts thereof being cut away to show the internal construction, FIGURE 2 is a perspective view of the rotor of the machine of FIGURE 1, FIGURE 3 is an exploded perspective view of one set of three stator elements of the machine of FIGURE 1, FIGURE 4 is a diagrammatic representation of the machine for the purpose of explanation, FIGURE 5 is a longitudinal section of another form of the machine, and FIGURE 6 is a section on the line VI—VI of FIGURE 5.

Referring to FIGURES 1, 2 and 3, the machine comprises a rotor assembly (FIG. 2) consisting of a shaft 1 on which are mounted two cylindrical bodies 2 and 3 of ferro-magnetic material arranged end to end, the outer end faces 4 and 5 extending in parallel planes at an angle to the axis of rotation. The shaft of the rotor assembly is journalled in bearings carried in the end frames 6 and 7 of the machine and each rotor portion 2 and 3 co-operates with a set of three stator elements which are arranged at 120° around the rotor.

As shown more clearly in FIGURE 3, the set of stator elements which co-operates with the rotor portion 2 comprises one member consisting of three arms 8 each formed integrally with a yoke portion 10, and a three-armed member 12 the arms of which fit beneath the respective ends of the yoke portions 10, both members being bored at 17 to receive the rotor portion 2 with a slight clearance. The set of stator elements co-operating with the rotor portion 3 is exactly similar and comprises arms 9, yoke portions 11, and three-armed member 13. The two sets of elements are so arranged that the two three-armed members 12 and 13 are adjacent and the arms are parallel to one another.

As shown, the windings of the machine comprise input windings consisting of two coils 14 and 15 surrounding the rotor portions 2 and 3 respectively and contained between the arms 8, 12 and 9, 13 of the associated stator elements, and three output windings 16 each surrounding one of the three pairs of parallel arms of the members 12 and 13.

Referring to FIGURE 4, it will be seen that if the input windings 14, 15 are energised to produce flux in the two magnetic circuits of the machine in the directions shown by the arrows, each output winding 16 will have a voltage induced therein which is proportional to the difference of the fluxes produced in the two adjacent arms 12, 13 of the stator elements which are surrounded by this winding.

As may be seen from FIGURE 4, with the rotor in the position shown, the flux in the magnetic circuit 3, 9, 13 will be a maximum whereas the flux in the other magnetic circuit 2, 8, 12 will be a minimum and will consist mainly of leakage flux. As the rotor is turned, the flux in arm 13 will decrease while the flux in the other arm 12 will increase; when the rotor reaches a position 180° from that shown, the total flux in the two arms 12, 13 will have reversed and the voltage output from the coil associated with these arms will again be a maximum but of opposite sign.

By appropriate shaping of the end faces of the rotor, the effect of leakage flux may be kept small and the induced voltage in each output winding 16 may be caused to vary sinusoidally as the rotor is turned and the three windings may therefore be arranged to produce a three-phase output.

A further form of the machine of this invention is shown in FIGURES 5 and 6. In general, the machine is essentially the same as that described with reference to FIGURES 1, 2, and 3 but differs in certain details which will now be described. Considering first the stator, it will be seen that this consists of three elements 18, 19 and 20 equi-spaced about the rotor 21 and each comprising a stack of E shaped laminations which is machined or otherwise shaped so that the radially outer end closely fits the interior of a hollow cylindrical casing 22 and the radially inner end is concentric with the rotor and spaced therefrom with a small clearance. The three stator elements are positioned within the casing 22 by means of members 23 and 24 which are also bored to provide a housing for ball bearings 25 in which the rotor shaft 26 is mounted. Adjustment of the axial position of the rotor 21 relative to the stator elements 18, 19 and 20 is effected by rings 27 and 28 which are screwed respectively into the end 29 of the casing 22 and with an insert 30 which is mounted in a terminal block 31 secured in the other end of the casing. The rings 27 and 28 are each formed with a skirt portion which engages the outer face of the outer race of the ball bearing 25 and by screwing the rings in or out the position of the race and hence the position of the rotor may be adjusted.

The rotor 21 in this form of the invention is formed of a single cylindrical piece of ferro-magnetic material but the axial end faces as before are parallel to each other and inclined to the axis of rotation.

As shown, the machine is provided with primary windings comprising two cylindrical coils 32 and 33 which surround the rotor 21 and are located in respective slots in the E shaped stator laminations, and secondary windings comprising three coils 34, 35 and 36 each surrounding the central projection of one stack of the E shaped stator laminations. The operation of this form of the machine is exactly the same as that described with reference to FIGURE 4.

It will be appreciated that the machine of this invention is not restricted to the use of three stator elements as in the illustrated embodiments. For some applications a lesser or a greater number of these elements may be required. For example a variable transformer would have only one or two stator elements while a resolver would equire two or four stator elements.

Likewise the windings of the machine may be used or arranged in any convenient manner and in general it is possible to arrange matters such that the machine of this invention produces the same results as can be obtained with any of the known synchro devices. Thus, the machine may be arranged to produce two output voltages one proportional to the sine of the rotor angle and the other proportional to the cosine in the same manner as in the case of a so-called resolver synchro. Likewise by appropriate variation in the shape of the rotor the voltage output can be made to be any desired simple function of the movement of the rotor.

I claim:

1. A dynamo electric machine comprising two cylindrical rotors arranged end to end on a driving shaft with the adjacent end faces of said rotors extending normal to the axis of said shaft and the remote end faces inclined to the said axis and parallel to one another, at least one stator element co-operating with each said rotor, said stator elements being arranged in axial alignment and each comprising a yoke having two pole pieces extending therefrom towards the associated rotor.

2. A dynamo electric machine as claimed in claim 1 including a first winding comprising two coils one around each of said rotors and a second winding around the adjacent pole pieces of the said stator elements.

3. A dynamo electric machine as claimed in claim 1 including a plurality of aligned stator elements arranged equi-angularly about said rotors.

4. A dynamo electric machine comprising a cylindrical rotor having axial end faces inclined to the axis of rotation and parallel to one another and at least one stator element, said element comprising a yoke extending in the direction of said axis and having three pole pieces extending therefrom towards said rotor, said pole pieces being adjacent the centre and the axial ends of said rotor respectively.

5. A dynamo electric machine as claimed in claim 4, said stator element comprising a stack of E shaped laminations.

6. A dynamo electric machine as claimed in claim 4 including a plurality of E shaped stator elements equi-angularly disposed about said rotor.

7. A dynamo electric machine as claimed in claim 4 including a first winding comprising two coils around said rotor and arranged respectively between an outer pole piece and the centre pole piece, and a second winding around said centre pole piece.

References Cited in the file of this patent

UNITED STATES PATENTS

| 1,470,093 | Modiglian | Oct. 9, 1923 |
| 2,842,729 | Hillman | July 8, 1958 |
| 3,071,703 | Mathews | Jan. 1, 1963 |

FOREIGN PATENTS

| 1,212,321 | France | Oct. 19, 1959 |